J. BLAEKER.
FLUID SEAL OR LOCK.
APPLICATION FILED OCT. 11, 1910.
999,693.
Patented Aug. 1, 1911.
2 SHEETS—SHEET 1.
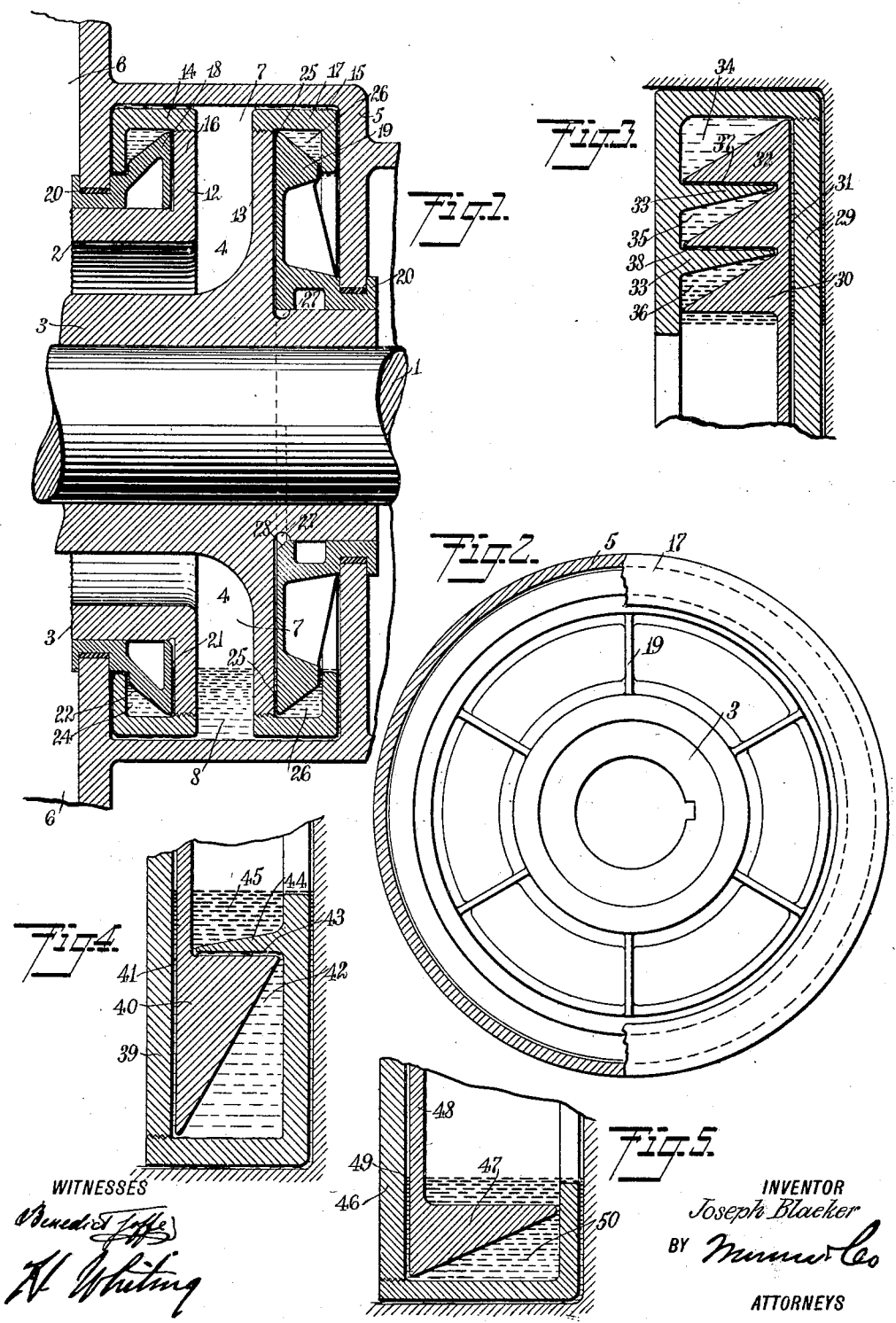
WITNESSES
INVENTOR
Joseph Blaeker
BY
ATTORNEYS J. BLAEKER.
FLUID SEAL OR LOCK.
APPLICATION FILED OCT. 11, 1910.
999,693.
Patented Aug. 1, 1911.
2 SHEETS—SHEET 2.
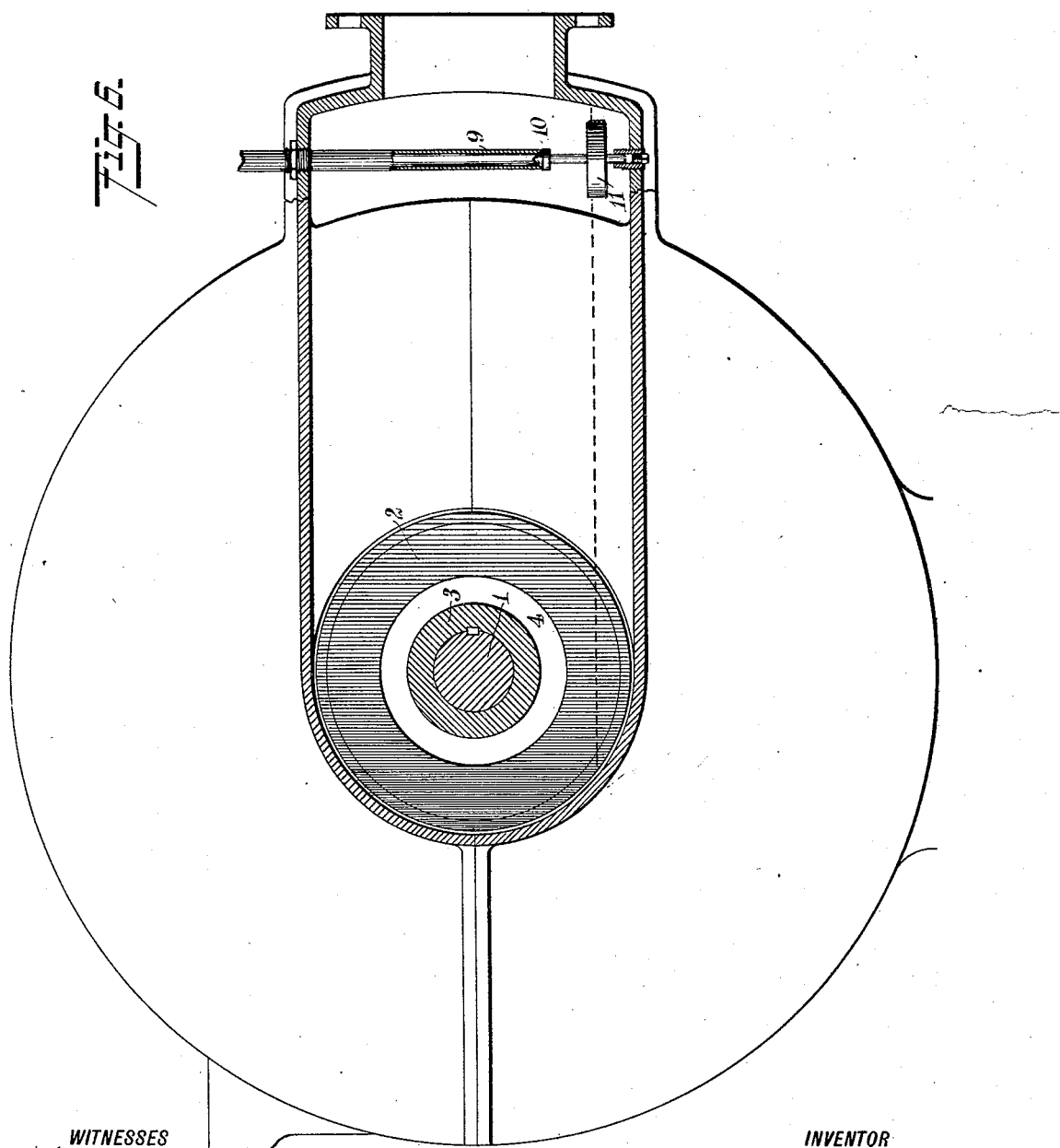
WITNESSES
INVENTOR
Joseph Blaeker
BY
ATTORNEYS

UNITED STATES PATENT OFFICE.

JOSEPH BLAEKER, OF NEW YORK, N. Y.

FLUID SEAL OR LOCK.

999,693.

Specification of Letters Patent.

Patented Aug. 1, 1911.

Application filed October 11, 1910. Serial No. 586,465.

*To all whom it may concern:*

Be it known that I, JOSEPH BLAEKER, a subject of the Czar of Russia, and a resident of the city of New York, borough of Brooklyn, in the county of Kings and State of New York, have invented a new and Improved Fluid Seal or Lock, of which the following is a full, clear, and exact description.

This invention relates to a new and improved liquid seal packing or lock to prevent the leakage of a motive fluid around a revolving shaft in such machines as turbines, centrifugal pumps, etc.

An object of this invention is to provide a liquid packing adapted to seal the space between a revolving member, such as a shaft, and a stationary member, such as a fixed casing, having no positive metal contacts, which will require no attention or adjustment, and which will be ready for action as soon as the shaft starts to rotate.

A further object of this invention is to provide a liquid packing which will be independent of the directions of rotation of the shaft, which does not depend on the smallness of the clearance, and which can be applied to either a vertical or a horizontal shaft.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a vertical section; Fig. 2 is an end view, partly in section; Fig. 3 is an enlarged fragmentary section illustrating a compound type of seal; Figs. 4 and 5 are enlarged sections illustrating forms in which variation in the pressure is obtained by varying the dimensions and form of the coöperating members; and Fig. 6 is a section showing the automatic control for the level of the water or other liquid in the chamber.

Referring more particularly to the separate parts of the device, 1 indicates a shaft, which is secured to and rotated by a rotor, portions of which are indicated at 2 and 3. Intermediate these portions is an exhaust passage 4, through which the steam or other motive fluid utilized to operate the rotor is exhausted. Surrounding the rotor and the shaft, there is provided a casing 5, which, to the left of the portion indicated in Fig. 1, is provided with a rotor chamber 6, subjected to high-pressure steam, and is also provided with a seal or lock chamber 7, within which is supplied a quantity of a liquid, indicated at 8, preferably water. As will be seen by reference to Fig. 6, this sealing liquid is supplied by means of a pipe 9, the outlet of which is controlled by a valve 10, the position of which is adjusted by means of a float 11, adapted to close the outlet of the pipe 9 when the sealing liquid has reached a sufficient level in the sealing chamber 7.

The rotary portions 2 and 3 of the rotor are provided with flanges 12 and 13, to which are detachably secured by screw-threaded connections, angle rings 14 and 15, forming with the flanges, channel wheels or fly wheels 16 and 17. These channel wheels, when rotated at a high speed, are adapted to dip up a quantity of the sealing fluid and hold this fluid, by its viscosity and the centrifugal force imparted thereto by the rotation of the channel wheels, in the form of peripheral annular rings within the channels and along the surfaces of the wheels. The sealing fluid, thus held by its viscosity and the centrifugal force imparted thereto, is divided into two portions by knife rings 18 and 19, which are secured to the stationary casing 5 and are thus stationary. Interposed between the casing 5 and each of these rings, there are provided soft-metal packing rings 20, which form an absolutely tight fit between these two stationary members. It will be noted that the ring 18 has a flat face on one side, which extends up to the edge of the ring and is spaced apart from the flange 12 a slight distance to form a narrow passage 21. From the outer sharp edge of this ring 18, the opposite side slopes away conically, as at 22, to form an annular passage 24 between the knife ring and the flange on the angle-iron 14, which is considerably larger than the passage 21 and preferably of triangular cross section, having its narrowest portion located nearest to the center on the shaft 1. The passage 21 communicating with the line of junction between the stationary ring 18 and the portion of the rotor 3, is thus in communication with the high-pressure steam or other motive fluid from the chamber 6, in case there should be leakage therethrough. On the other hand, the annular passage 24 is in communication with the exhaust passage 4. We thus have the fluid ring held by its viscosity and centrifugal force in the channel ring 16, exposed on the one hand in the narrow passage 21, to the high-pressure steam and on the other hand, in the wide passage 24, to the pressure in the exhaust. It will thus be seen that any tendency of the high-pressure steam to force its way out acts on the very small surface area of the fluid in the passage 21, while the pressure in the exhaust passage 4 acts on the large area in the large passage 24. The steam, however, not only has to overcome the total centrifugal force imparted to the fluid in the channel ring 16, but also must compress or endeavor to compress the fluid in the passage 24, in order to force it out of the wedge-shaped passage. The high-pressure steam is therefore resisted by the centrifugal force of the annular ring of fluid in the channel ring 16, and also by the resistance of the fluid to compression between the wedging sides of the knife ring 18 and the radial flange on the angle ring 14.

In the case of the channel ring 17, it will be noted that the knife ring 19 divides the centrifugally-held annular ring of fluid in the channel ring, into two portions located in a narrow annular passage 25 and the large wedge annular passage 26, which communicate, respectively, with the atmosphere and the exhaust. Thus, the atmospheric pressure, which is greater in this case when the machine is run condensing, has to overcome the centrifugal force of the fluid by its action on the very small surface area, and also has to overcome the resistance which the fluid offers to being compressed between the wedge sides of the annular passage 26.

It will be noted that the portions of the rotor are provided with circular grooves 27, which permit the fluid to drain down, when the rotor has stopped, into the bottom of the lock chamber, where it can be collected. To aid this action, the supported knife rings 19 are beveled at their lower half in juxtaposition to these grooves, as at 28.

Where the difference between the high-pressure and the low-pressure side of this hydraulic lock is of considerable magnitude, it may be necessary to multiply the effect of the lock forming what may be designated as a multiple lock or seal. Fig. 3 shows one form of such multiple lock, in which 29 indicates the fly wheel or channel wheel, and 30 indicates the knife ring. The knife ring is spaced apart on its flat side from the adjacent ring so as to form an annular passage 31, which is exposed to the high pressure, and on its opposite side, is provided with a plurality of wedge rings 32, which form between the sides of the channel ring and web rings 33 interposed between the successive wedge rings 32, successive passages 34, 35 and 36, which are annular and wedge-shaped, having their narrowest portion in closest communication with the passage 31, and their widest portion in closest communication with the surface exposed to the low pressure. These web rings 33 are also preferably wedge-shaped and provided with exterior cylindrical surfaces, located in juxtaposition to interior cylindrical surfaces of the wedge rings 32, so that there are formed narrow passages 37 and 38, which connect the passages 34, 35 and 36 together. It will thus be seen that not only the volume of the fluid and its difference in surface area exposed to pressure is increased, but also the resistance of compression is increased by the successive wedge passages.

Fig. 4 illustrates a form comprising a channel ring 39 of considerable radial depth, a wedge knife ring 40 of corresponding magnitude, which divides the compartment in the channel ring into a high-pressure passage 41 and a low-pressure passage 42, the latter being wedge-shaped at its outer portion and provided with a narrow passage 43 formed between the inner cylindrical surface of the wedge-knife ring 40 and the outer cylindrical surface of a web ring 44 on the channel wheel 39, forming a line of communication with the inner portion of the passage indicated at 45 which is exposed to the low pressure.

Fig. 5 illustrates a form in which the annular channel in the channel wheel indicated at 46, is of considerable width, and whereby a greater difference in surface exposed to the high-pressure and low-pressure is obtained, by increasing the width of the wedge ring 47 on the knife ring 48, forming the high-pressure passage 49 and the low-pressure passage 50.

It will thus be seen that there is provided a simple and efficient hydraulic lock or seal between relatively-movable parts exposed on opposite sides of the junction to high pressure and low pressure, respectively, wherein the high pressure is allowed to act on a very small surface, and the low pressure is allowed to act on a large surface, and further, wherein the high pressure has to overcome both the centrifugal force of the sealing fluid and its resistance to compression before a leakage can occur.

While I have shown several embodiments of my invention, I do not wish to be limited to the specific details thereof, but desire to be protected in various changes, modifications and alterations which may come within the scope of the appended claims.

Having thus described my invention, I claim as new and desire to secure by Letters Patent:—

1. The combination with a pair of relatively-movable members, of a channel wheel secured to one of said members and having a sealing-fluid channel formed therein, and a knife ring secured to the other of said members and being adapted to divide said channel into a passage of small magnitude and a passage of large magnitude, said passages being adapted to be subjected respectively to high and low pressure, whereby a balance is obtained between them.

2. The combination with a pair of relatively-movable members, of a channel wheel secured to one of said members and having a sealing-fluid channel formed therein, and a knife ring secured to the other of said members and being adapted to divide said channel into a passage of small magnitude and a passage of large magnitude, said passages being adapted to be subjected respectively to high and low pressure, whereby a balance is obtained between them, said knife ring having a radial surface on one side and a bevel surface on the other side, whereby said small passage is formed radially and said large passage is formed in an annular wedge shape, thus tending to resist the movement of the sealing fluid from said small passage to said large passage.

3. The combination with a rotary channel wheel having an internal channel therein adapted to contain a sealing fluid, of a stationary knife ring adapted to divide said channel into annular passages, one of said passages being of less magnitude than the other of said passages.

4. The combination with a rotary channel wheel having an internal channel therein adapted to contain a sealing fluid, of a stationary knife ring adapted to divide said channel into annular passages, one of said passages being of greater magnitude than the other of said passages and being norrower at its inner side than at its outer side.

5. The combination with a casing having a seal lock chamber therein adapted to contain a sealing fluid, of one or more rotary channel wheels mounted in said chamber and each having a channel adapted to scoop up sealing fluid and hold the fluid against its outer periphery by centrifugal force in the form of an annular ring, and a knife ring projecting in said channel adapted to divide said channel into a plurality of annular passages.

6. The combination with a casing having a seal lock chamber therein adapted to contain a sealing fluid, of one or more rotary channel wheels mounted in said chamber and each having a channel adapted to scoop up sealing fluid and hold the fluid against its outer periphery by centrifugal force in the form of an annular ring, a knife ring projecting in said channel adapted to divide said channel into a plurality of annular passages, and means for maintaining a predetermined level of the sealing fluid in said chamber.

7. The combination with a casing having a seal lock chamber therein adapted to contain a sealing fluid, of one or more rotary channel wheels mounted in said chamber and each having a channel adapted to scoop up sealing fluid and hold the fluid against its outer periphery by centrifugal force in the form of an annular ring, a knife ring projecting in said channel adapted to divide said channel into a plurality of annular passages, and means for maintaining a predetermined level of the sealing fluid in said chamber, said means comprising a supply pipe, a valve for said supply pipe, and a float for operating said valve.

In testimony whereof I have signed my name to this specification in the presence of two subscribing witnesses.

JOSEPH BLAEKER.

Witnesses:
 HORATIO WHITING,
 PHILIP D. ROLLHAUS.

---

Copies of this patent may be obtained for five cents each, by addressing the "Commissioner of Patents, Washington, D. C."